US 11,313,706 B2

(12) United States Patent
Bauermann et al.

(10) Patent No.: US 11,313,706 B2
(45) Date of Patent: Apr. 26, 2022

(54) SENSOR DEVICE HAVING A CONVERTER WITH A FLEXIBLE ELECTRICALLY CONDUCTIVE CONVERTER ELEMENT AND A RESETTING DEVICE

(71) Applicant: ROSEN SWISS AG, Stans (CH)

(72) Inventors: Rainer Bauermann, Lingen (DE); Martin Brücher, Lingen (DE); Natalia Rodriguez, CR Enschede (NL)

(73) Assignee: ROSEN SWISS AG

( * ) Notice: Subject to any disclaimer, the term of this patent is extended or adjusted under 35 U.S.C. 154(b) by 123 days.

(21) Appl. No.: 16/648,903

(22) PCT Filed: Sep. 14, 2018

(86) PCT No.: PCT/EP2018/074954
§ 371 (c)(1),
(2) Date: Mar. 19, 2020

(87) PCT Pub. No.: WO2019/057642
PCT Pub. Date: Mar. 28, 2019

(65) Prior Publication Data
US 2020/0225068 A1    Jul. 16, 2020

(30) Foreign Application Priority Data
Sep. 20, 2017    (DE) .......................... 202017105712.7

(51) Int. Cl.
*G01F 1/58*    (2006.01)
*G01F 15/14*   (2006.01)
*G01F 15/18*   (2006.01)

(52) U.S. Cl.
CPC .............. *G01F 1/582* (2013.01); *G01F 15/14* (2013.01); *G01F 15/18* (2013.01)

(58) Field of Classification Search
None
See application file for complete search history.

(56) References Cited

U.S. PATENT DOCUMENTS 9,297,678 B2 * 3/2016 Heinks .................... G01F 1/667
2007/0107533 A1   5/2007 Molenaar et al.
2010/0259252 A1   10/2010 Kim et al.
(Continued)

FOREIGN PATENT DOCUMENTS

CN    103582804 A    2/2014
CN    205703835 U    11/2016
(Continued)

*Primary Examiner* — Harshad R Patel
(74) *Attorney, Agent, or Firm* — Husch Blackwell LLP

(57) ABSTRACT

A sensor device is provided for fitting to an object through which a medium flows, in particular to a pipeline. The sensor device comprises at least one converter device having at least one flexible converter element which comprises at least one electrically conductive conductor element and, for the sectional coverage of the object, is transposable to an operating position, in which it is at least partially arranged about a longitudinal axis. The converter device comprises a resetting device having at least one transmission element which is arranged on the converter element. The resetting device is provided for the setting and/or resetting of the converter element in the operating position.

26 Claims, 9 Drawing Sheets

(56) References Cited

U.S. PATENT DOCUMENTS

| | | | | |
|---|---|---|---|---|
| 2013/0080081 A1* | 3/2013 | Dugger | ............... | G01F 1/662 |
| | | | | 702/48 |
| 2016/0290965 A1 | 10/2016 | Owens et al. | | |
| 2020/0333229 A1* | 10/2020 | Bitto | ............... | G01F 1/8413 |

FOREIGN PATENT DOCUMENTS

| | | |
|---|---|---|
| CN | 104874538 B | 5/2017 |
| DE | 10036696 A1 | 2/2001 |
| DE | 102004063482 B3 | 8/2006 |
| DE | 102006018415 A1 | 10/2007 |
| DE | 102007058043 A1 | 6/2009 |
| DE | 102011015677 A1 | 10/2012 |
| DE | 102012009076 A1 | 11/2013 |
| DE | 202012104036 U1 | 2/2014 |
| DE | 102012019217 A1 | 4/2014 |
| EP | 104655 A1 | 4/1984 |
| JP | 2014115128 A | 6/2014 |
| WO | 2010118793 A1 | 10/2010 |
| WO | 2012129101 A1 | 9/2012 |
| WO | 2012135206 A2 | 10/2012 |
| WO | 2014164307 A1 | 10/2014 |
| WO | 2016113283 A1 | 7/2016 |
| WO | 2017019785 A1 | 2/2017 |
| WO | 2017019877 A1 | 2/2017 |

* cited by examiner

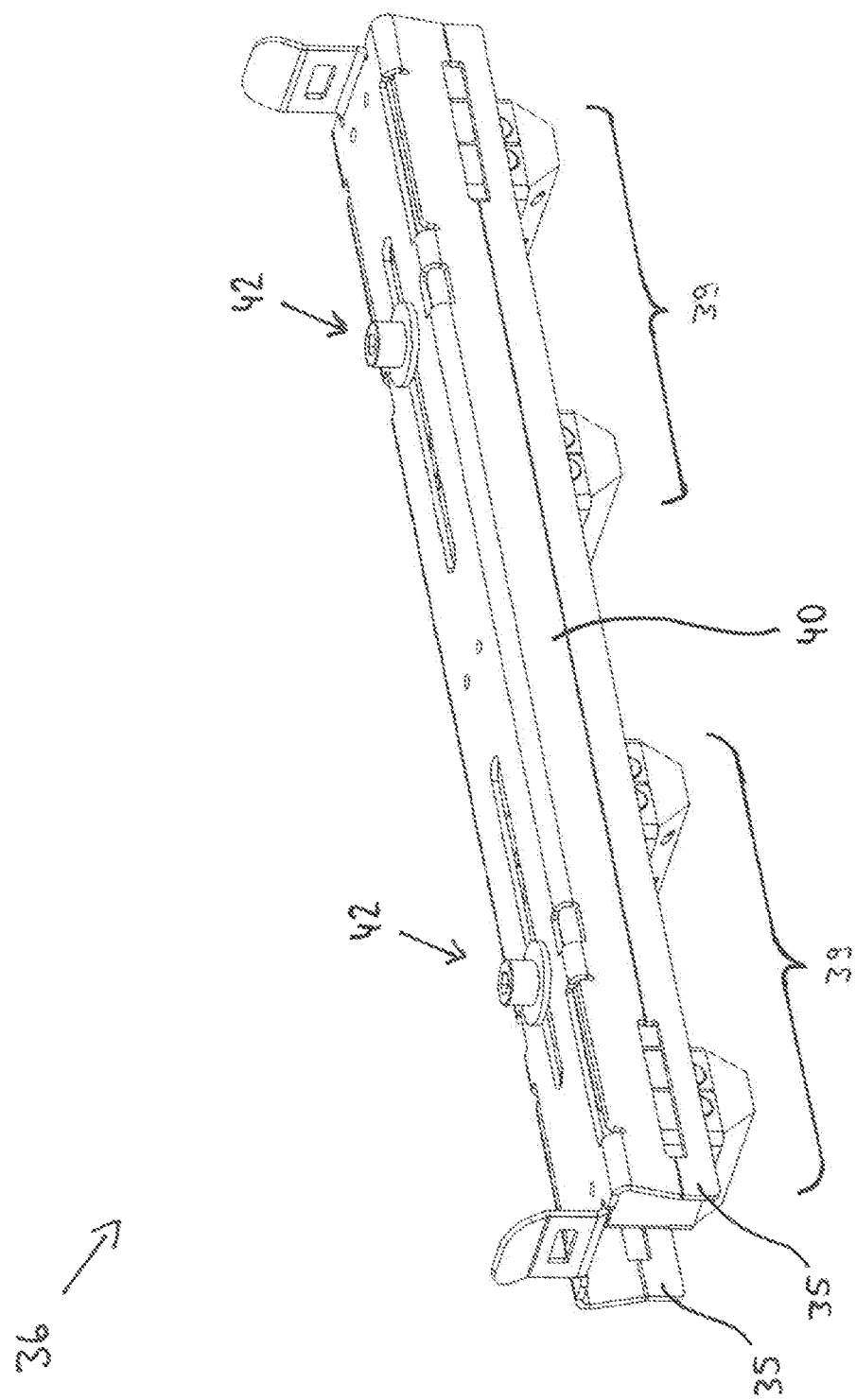

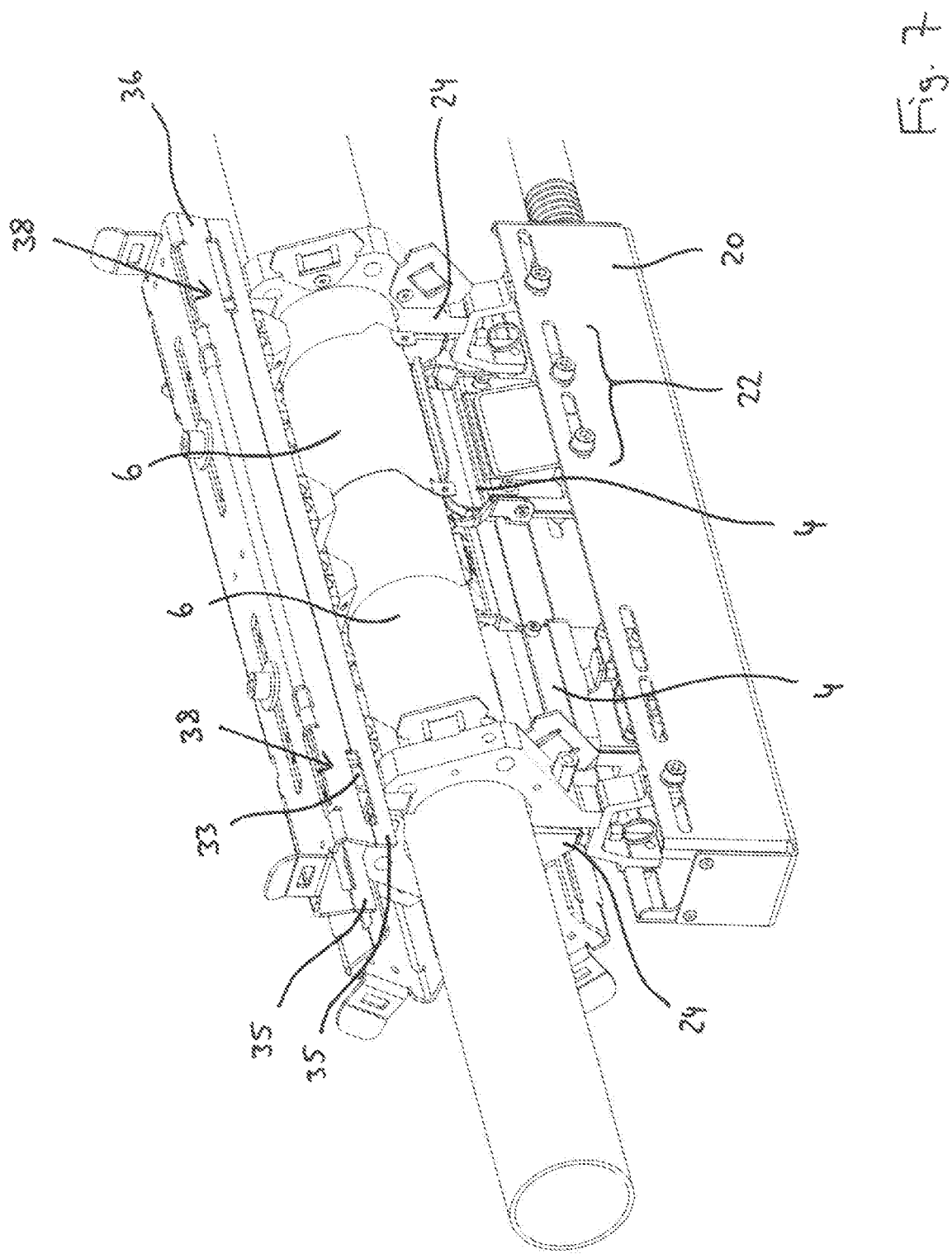

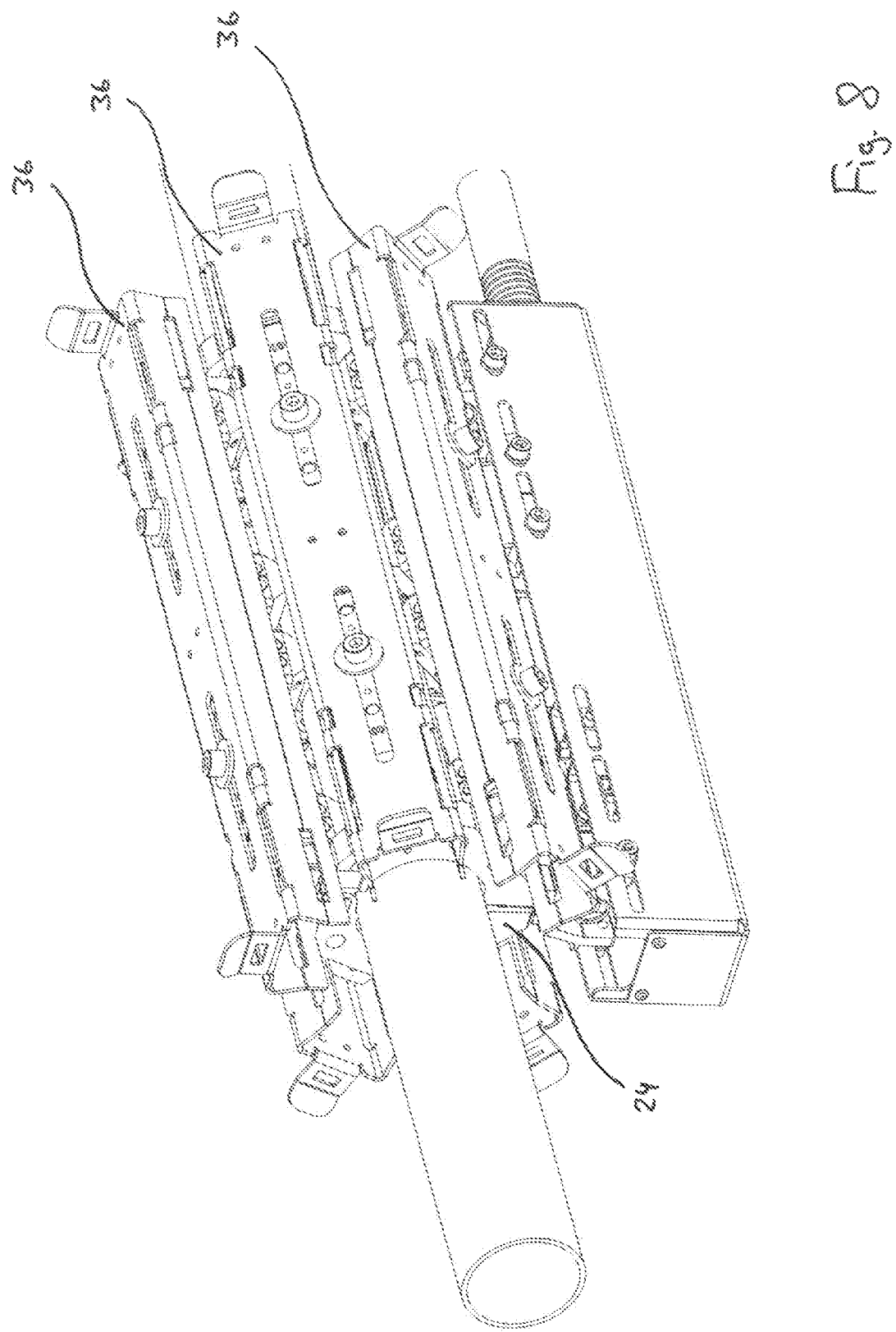

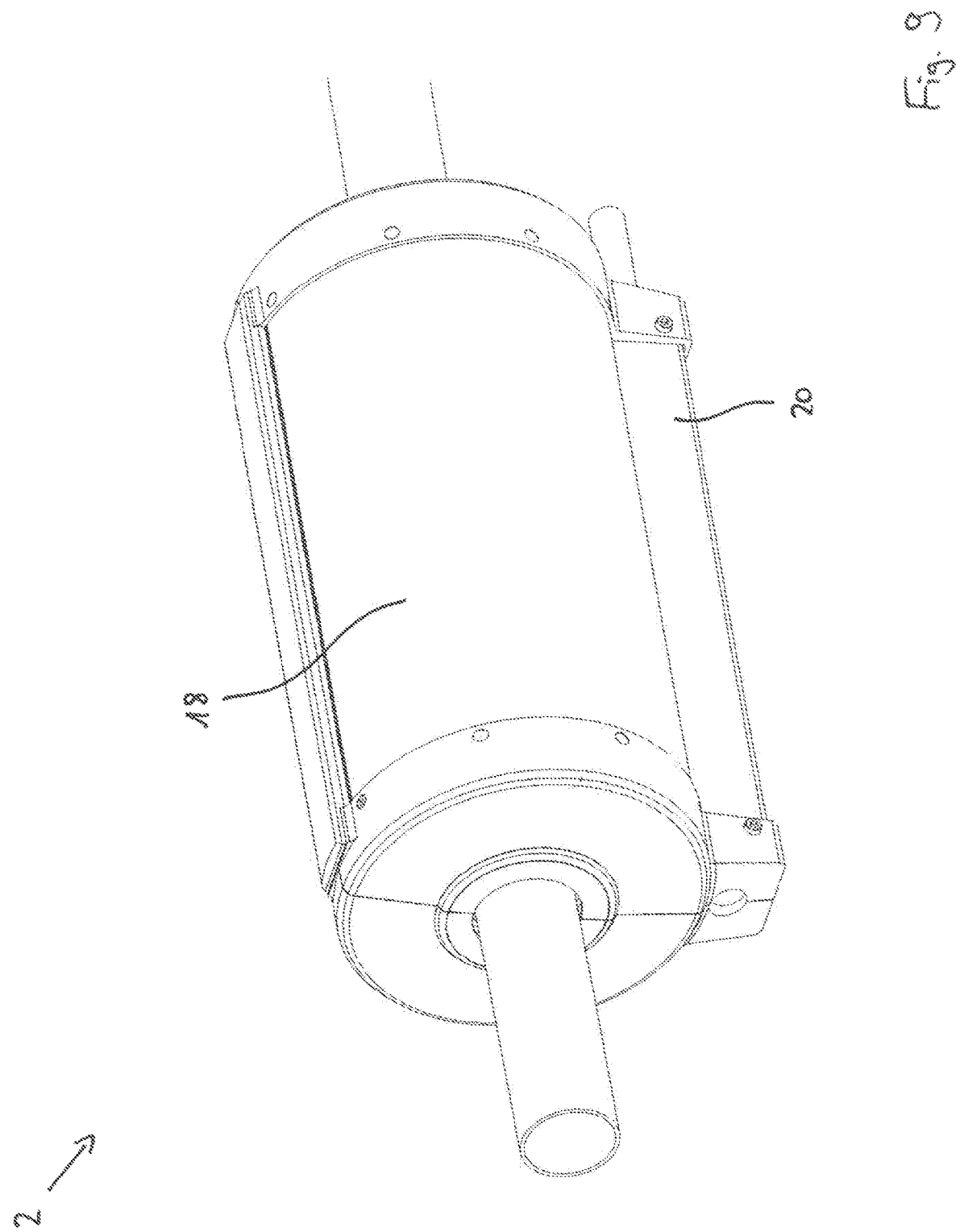

SENSOR DEVICE HAVING A CONVERTER WITH A FLEXIBLE ELECTRICALLY CONDUCTIVE CONVERTER ELEMENT AND A RESETTING DEVICE

CROSS REFERENCE

This application claims priority to PCT Application No. PCT/EP2018/074954, filed Sep. 14, 2018, which itself claims priority to German Application No. 10 2017 105712.7, filed Sep. 20, 2017, the entirety of both of which are hereby incorporated by reference.

FIELD OF THE INVENTION

The invention relates to a sensor device for fitting to an object through which a medium flows, in particular to a pipeline. The sensor device comprises at least one converter apparatus which comprises at least one flexible converter element. The converter element comprises at least one electrically conductive conductor element and, for the sectional enclosure of the object, is transposable to an operating position, in which it is at least partially arranged about a longitudinal axis.

In the operating position, the flexible converter element is strictly positioned on the surface of the object, such that the conductor element essentially assumes a constant clearance to the object. The converter element in this case can lie directly on the surface of the object or, for example, can be spaced from the object by an intervening insulator. In the operating position, the converter element at least partially encloses the object along its circumference.

BACKGROUND

A sensor device of this type is known from the published patent application DE 10 2011 015 677 A1, which discloses an acoustic flow meter. A foil incorporating an electrical conductor or a ribbon cable is in this case wound around a pipe, wherein the conductor is arranged in a meander-shaped pattern. Further to the fitting of the converter apparatus, the converter element is held in position by a retaining device.

In the operation of the sensor device, the function of the converter apparatus is the conversion of a signal. The conductor element and the object through which a medium flows thus exercise a mutual influence upon each other. Sensor devices of this type are employed, for example, for the generation or detection of sound waves, for example for the measurement of flow rates or material defects in the object. To this end, according to the prior art, magnetic fields are employed, which permeate the object.

In service, objects through which a medium flows, such as pipelines, may be subject to heat-up, depending upon the temperature of the medium carried. One consequence of such a temperature increase is an expansion of the constituent material of the object. In pipes, this expansion generally results in an increase in the pipe diameter.

Above-mentioned sensor devices having a retaining device, which holds the converter element in its operating position, can only operate reliably in the event of constant pipe diameters. As the retaining device secures the converter element in the position which was set upon installation, any change in the shape of the object results in a detachment of the converter element from the retaining device, or in damage to the converter apparatus. Particularly in the event of a reduction in the diameter of the object, in consequence, no strict positioning of the converter element in the operating position, which permits the optimum operation of the sensor device, can be ensured.

A further disadvantage of known sensor devices is their layout, as a result of which installation is challenging, and the application of their components is limited to objects of a specific cross-section.

SUMMARY OF THE INVENTION

The object of the present invention is the provision of an easily-installed sensor device having enhanced operational security.

According to the invention, this object is fulfilled by a sensor device, at least one converter device of which comprises a resetting device, having at least one transmission element which is arranged on the converter element. The resetting device is provided for the setting and/or resetting of the converter element in the operating position.

The transmission element transmits a force to the converter element for the positioning thereof in its operating position. The force acts by way of a tensile force or a compressive force on the converter element, and preferably, at least proportionally, in a tangential direction relative to the longitudinal axis, i.e. the force is oriented, with respect to a circular path, about the longitudinal axis in a tangential direction. Alternatively, the force acts on the converter element in a radial direction. The transmission element itself is elastically or rigidly configured in this case. The resetting device is arranged on the converter device or on another part of the sensor device.

In the operating position of the converter element, the longitudinal axis coincides with the longitudinal centre line of the flow-carrying object. In particular, it is oriented in parallel with the main direction of flow. In the operating position, the shape of at least one surface portion of the converter element corresponds to the shape of one surface section of the object, on which the sensor device is installed. This surface section is covered by the converter element to the extent that it either lies directly on the surface of the object, or is spaced from the latter, wherein the conductor element on the converter element preferably assumes an essentially constant distance from the surface section.

The conductor element, in the operating position of the converter element, is at least sectionally oriented in a circumferential direction relative to the longitudinal axis. In particular, the conductor element is thus oriented in a full-circumference arrangement about the longitudinal axis, or in a meander-shaped pattern on the converter element.

Upon the installation of the sensor device, the surface section of the object is covered by the converter element and transmission element arranged on the converter element. Upon installation, the resetting device ensures the reliable setting of the converter element in the operating position. The converter element, either directly or indirectly, i.e. with a clearance to the object produced, for example, by an intermediate layer, is thus strictly positioned on the object surface. In the event of changes in the diameter of the object in the installed state of the sensor device, for example a reduction in the object diameter, the resetting device executes a resetting of the converter element into the operating position. Moreover, flexibility in the arrangement of the converter element is provided, in the event of an expansion in the diameter of the flow-carrying object.

By means of the resetting device, the sensor device is characterized by enhanced operational security, as the optimum positioning of the converter element in the operating position is ensured, even in the event of a relative movement of the object. Moreover, the converter element is set in the operating position by the resetting device in an essentially autonomous manner, thereby simplifying the installation of the sensor device.

The converter element is preferably flexurally elastic. As a result, the converter element or the converter device can be employed in multiple applications on objects of different diameters and shapes. Moreover, elasticity facilitates the resetting of the converter element, thereby enhancing the operational security thereof.

Alternatively, the object is fulfilled, according to the invention, by a carrier device which is detachably fitted to the converter device, the function of which is the bracing of the sensor device on the object. The converter device is thus at least partially enclosed by a housing.

Upon the installation of the sensor device, the carrier device is secured on the object. It prevents a relative movement of the object and the sensor device in a parallel direction to the longitudinal axis. The detachable fastening of the converter device on the carrier device simplifies the installation of the carrier device to the extent that the converter device is braced on the carrier device and, as a result, the converter element which, in sections, covers the object, is not overloaded. In particular, the individual parts of the sensor device can be installed sequentially. The modular structure of the sensor device, comprising a converter device and a carrier device, moreover permits the simple replacement of individual components of the sensor device, and thus enhances operational security. In particular, carrier devices, the use of which is critically dependent upon the shape and the dimensions of the object, can be combined with different converter devices, the selection of which, in turn, is dependent upon the variable to be measured and, for example, the material properties of the object.

The housing protects the sensor device against environmental influences. It partially encloses the converter device to the extent that at least one region of the converter device lies between two sections of the housing. The housing has a one-part or multi-part structure and, in particular, is at least formed in combination with the carrier device. The converter device is at least partially arranged between the housing and the object. The function of the housing is the shielding of the sensor device from the environment, thereby protecting its functional elements. As the converter device and the housing are configured separately from each other, they can be sequentially fitted to the object in a particularly simple manner.

The housing for the enclosure of the converter device and the longitudinal axis is preferably configured through at least 180° in the circumferential direction, such that a notional straight line, which is perpendicular to the longitudinal axis and intersects with the latter, traverses the housing on either side of the longitudinal axis. It is particularly preferred that the housing encloses the full circumference of the converter device. By this configuration of the housing, the converter device is particularly reliably protected against environmental influences.

In an advantageous configuration of the invention, the housing assumes a greater extension in the direction of the longitudinal axis than the carrier device. The housing is thus at least not exclusively constituted by the carrier device. The greater extension of the housing in the direction of the longitudinal axis also permits the full inclusion of the converter element in an axial direction relative to the longitudinal axis, wherein the housing can adjoin the object at end faces of the sensor device. By this design of the housing, the converter device is particularly effectively separated from the environment, and environmental influences are minimized.

The carrier device preferably comprises a receptacle which at least partially encloses the converter device. The converter device is braced by the receptacle, the shape of which accommodates the converter device, at least in one section. The receptacle preferably has a U-shaped cross-section, and the converter device is detachably fastened to the receptacle. By the partial enclosure of the converter device, the latter is mechanically protected in a particularly effective manner. The fastening of the converter device to the receptacle moreover relieves the load on the converter element, thereby extending the service life of the latter.

Preferably, the housing is configured in combination with the receptacle of the carrier device. The receptacle thus adjoins the environment and, by means of its two-fold function as a housing part and a brace for the converter device, reduces the complexity of assembly of the housing and the dimensions and/or number of further parts required for this purpose.

It is particularly preferred that the converter device and the carrier device, in particular the receptacle, constitute a converter guide assembly. By means of the latter, the converter device and the carrier device, in particular the receptacle, can be displaced and fastened relative to one another in a parallel direction to the longitudinal axis. In an advantageous form of embodiment, the converter device and the carrier device can, moreover, be displaced and fastened in a further direction, transversely to the longitudinal axis. It is particularly preferred that the converter guide assembly comprises at least one slot, having a guide pin and/or a screw. The converter device can thus be secured in a variable position on the carrier device. The optimum position of the converter device, in which the latter assumes its maximum operational security, can be simply adjusted during the fitting of the converter device by means of the converter guide assembly. In particular, the facility for the variable axial positioning of the converter device is maintained, further to the fastening of the carrier device to the object.

A thermally-insulating insulation material is preferably arranged within the housing. The insulation material is primarily comprised of PVC, glass fibre or glass wool, rockwool, aluminium, rubber or a foam. By means of the insulation material, any heat-up of the housing in response to a high temperature of the object is limited, thereby reducing the loading of the housing material. The converter device is moreover protected by the insulation material. The operational security of the sensor device is enhanced accordingly.

In an advantageous configuration of the invention, the carrier device comprises at least one clamping apparatus which is transposable to a clamping position, for the detachable attachment of the sensor device to the object. The clamping apparatus comprises at least two clamping elements. The clamping elements engage directly with the object, and constitute a preferably friction-locked connection between the object and the clamping apparatus. By the clamping of the carrier device on the object, the fitting of the sensor device is particularly simple. The friction-locked connect ion permits the non-destructive fitting of the sensor device, and permits the reliable operation of both the sensor device and the object. The clamping apparatus can be fitted first, and further parts can be fitted thereafter.

The carrier device preferably comprises at least two clamping apparatuses, which are spaced from one another in an axial direction, relative to the longitudinal axis. As a result, the sensor device is attachable to the object in a particularly stable manner, and the operation thereof is particularly secure.

The first clamping element is preferably pivotably arranged, relative to the second clamping element. The clamping apparatus is thus detachable from the object, without the necessity for the clamping elements to be completely separated from one another. The pivoting of the first clamping element relative to the second permits the particularly simple fitting and removal of the sensor device. The pivoting axis is thus preferably arranged parallel to the longitudinal axis of the sensor device, in order to permit the achievement of the smallest pivoting angle possible for the removal of the sensor device, thereby minimizing the complexity of operation.

The clamping apparatus preferably comprises a latching assembly which latches the clamping elements relative to one another, further to the transposition thereof to the clamping position. Further to the sufficient pivoting of the clamping elements relative to one another, and about the object, said assembly ensures the latching of the clamping elements relative to one another, immediately these assume the clamping position, or a position which approximately corresponds to the clamping position. By latching, at least any converse pivoting is prevented, up to the application of a certain degree of force. The fitting of the clamping device to the object is simplified accordingly.

It is particularly preferred that the clamping apparatus, alternatively or additionally, comprises a pre-tensioning device which pretensions the clamping elements. By means thereof, the clamping position is constituted or secured by the pre-tensioning of the clamping elements relative to one another. A screw is preferably employed for this purpose, by means of which the clamping apparatus is secured in a self-locking manner. By means of the pre-tensioning device, a particularly reliable positioning of the sensor device on the object is ensured.

In an advantageous configuration of the invention, the clamping apparatus comprises at least two clamping webs for the bracing of the clamping apparatus on the object. The clamping webs are arranged on surfaces of the clamping apparatus which face the object and, in the clamping position, engage with the object. The clamping webs are simultaneously the only elements of the clamping apparatus which lie in contact with the object. In the clamping position, the clamping webs, relative to the entire carrier device, assume the shortest distance to the centre line of the object or the longitudinal axis. Each clamping element preferably comprises exactly two clamping webs. These are respectively arranged in clamping element regions which, in the circumferential direction, adjoin the other clamping element.

Thus, in the clamping position, two clamping webs respectively are arranged adjacently to one another, and in opposition to two further clamping webs, wherein the respectively adjoining webs are constituted by different clamping elements. By this arrangement, the local application of force to the object by the clamping apparatus can be limited, with the achievement of good clamping stability. As a result, the clamping apparatus is particularly reliably positioned, and is insensitive to circumferential changes in the object.

The clamping apparatus and the receptacle preferably comprise a receptacle guide assembly, by means of which they can be displaced and fastened relative to one another, parallel to the longitudinal axis. In particular, they can additionally be displaced transversely to the longitudinal axis. The receptacle guide assembly is preferably configured by means of a slot and a guide pin and/or a screw. The displaceability of the clamping apparatus relative to the receptacle facilitates the fitting of the sensor device, to the extent that the clamping apparatus can be fitted to the object with a significant tolerance in an axial direction relative to the longitudinal axis, wherein the exact position of the converter element is not dependent thereupon. Fitting can thus be executed particularly rapidly, using a locally optimized surface section of the object.

The sensor device preferably comprises at least one magnetization apparatus for the generation of a static or quasi-static magnetic field. A quasi-static magnetic field is understood as a magnetic field which, in calculations, can be considered as static vis-a-vis a high-frequency magnetic field which is generated by the conductor element, to which an AC current source is applied in-service. In particular, a quasi-static magnetic field varies with a frequency of ≤200 Hz, preferably of ≤10 Hz. Accordingly, electromagnetically generated magnetic fields can also be considered as static. By means of the magnetization apparatus, through interaction with the conductor element, it is possible to generate ultrasound waves in the object. The magnetization apparatus is preferably arranged on the carrier element or on the housing. Alternatively, the magnetization apparatus is arranged on the converter apparatus. By the integrated generation of the magnetic field, the operation of the sensor device, in comparison with a device of this type which employs an externally generated magnetic field, is particularly reliable.

The magnetization apparatus is preferably detachably fastened to the carrier device, particularly by means of at least one clamping connection. The fastening of the magnetization apparatus to the carrier device permits a particularly simple and modular layout of the sensor device, thereby simplifying assembly. The greatest possible stability is provided by direct arrangement on the carrier device. Fastening is executed by means of a clamping connection, which is realized by an elastic component, either as part of the carrier device or as part of the magnetization apparatus. In particular, the magnetization apparatus comprises at least two mutually opposing elastic sections which, in the assembled state of the magnetization apparatus, enclose a rigid element of the carrier device. The clamping connection is thus constituted solely by the push-fitting of the magnetization apparatus onto the rigid element, in the radial direction. By means of the clamping connection, the magnetization apparatus can be fastened and released in a particularly simple manner, as a result of which both the fitting and the removal of the sensor device are simplified.

It is particularly preferred that the magnetization apparatus comprises at least one magnet. This is either a permanent magnet or an electromagnet. In particular, the magnetization apparatus comprises two magnets which are spaced from one another in a parallel direction to the longitudinal axis. These magnets permit the generation of the magnetic field in a particularly operationally secure manner. By means of a plurality of mutually axially spaced magnets, the sensor device possesses a particularly broad functional scope, which can be implemented in a particularly reliable manner by the layout thereof.

In an advantageous configuration of the invention, a magnet guide assembly is constituted by the magnets and a magnet carrier of the magnetization apparatus. By means of said assembly, the magnet and the magnet carrier can be displaced and fastened relative to one another, parallel to the longitudinal axis. The magnet can thus be optimally and incrementally positioned in relation to the converter apparatus, independently of the position of the carrier device.

Preferably at least two, and in particular at least four magnetization apparatuses are arranged on the clamping apparatus, and are spaced from one another in a circumferential direction relative to the longitudinal axis. The plurality of magnetization apparatuses, in the fitted state, in this case assume an essentially equal distance to the surface of the object. The converter element is arranged between the magnetization apparatuses and the object. The plurality of magnetization apparatuses permit the constitution of a substantially uniform magnetic field in the region of the object surface which is covered by the converter element. As a result, in particular, the constitution of sound waves in the object is possible in a particularly reliable manner.

The resetting device preferably comprises an energy store. It is particularly preferred that the energy store comprises at least one spring or an elastic plastic and, in particular, is arranged on the converter apparatus. Accordingly, the force transmitted by the transmission element is substantially proportional to the displacement of the resetting device, such that the resetting function is particularly reliable. In an advantageous configuration of the invention, the transmission element and the energy store are integrally configured. The function of the energy store is the delivery of the requisite force for the setting or resetting of the converter element. Said store thus enhances the operational security of the sensor device. Resetting of the converter element is thus achieved in a particularly reliable manner.

The converter device preferably comprises a locating connection device for the clamping of the converter element. By the clamping of the converter element, the latter can be located on the connection device in a non-destructive manner. A particularly preferred function of the connection device is the location of the energy store, and it is preferably partially enclosed by the receptacle. By means of clamping, the conductor element can be connected to a current source in a particularly reliable manner.

The connection device preferably comprises a potting region. Within the latter, at least one end region of the conductor element is arranged on a further conductive component, which transmits the signal thereof. In particular, the contact region of the conductor element and the further component, further to the connection thereof, are potted in plastic, by means of which the conductive regions are completely insulated from the environment. By means of the potting region, in particular, a void within which the end region of the conductor element or the contact region is located is filled with a solidified material. Any ingress of moisture or other environmental influences, and the contact thereof with the conductor element and the contact region, is thus prevented in a particularly effective manner. The durability of the connection is thus ensured, and the operational security of the sensor device enhanced.

In an advantageous configuration of the invention, the sensor device comprises at least two converter devices which are mutually spaced in a parallel direction to the longitudinal axis. In particular, a plurality of magnets which are mutually spaced in a circumferential direction are assigned to each of the converter devices. The plurality of converter devices extends the functional scope of the sensor device, and the installation thereof is simplified to the extent that each converter device, depending upon the measuring set-up, exercises only one function, is subject to reduced loading as a result and, in the event of the occurrence of a fault, can be individually replaced.

The transmission element is preferably arranged on the converter device such that the converter device is exposed to a force acting in an essentially tangential direction. In particular, the transmission element is thus braced on the connection device. By the action of the force in one of the main extension directions of the converter element, the latter sustains the least possible damage as a result of exposure to said force, which is a tensile force. In turn, this permits a long service life of the converter device, and a secure positioning of the converter element in the operating position.

It is particularly preferred that the transmission element is pivotable about a pivoting axis, which is arranged in parallel with the longitudinal axis. As a result, force from the energy store is transmitted to the converter element in a particularly simple manner. The energy store can exert its force on the transmission element from different directions and, in particular, can act thereupon in a radial direction, relative to the longitudinal axis. By the potential pivoting of the transmission element, the latter can translate the force in an optimum manner, thereby enhancing the reliability of the resetting device.

It is particularly preferred that the transmission element, in the operating position of the converter element, is arranged on at least two connection regions of the converter element, which are spaced from one another in a parallel direction to the longitudinal axis. By the transmission of force to a plurality of connection regions of the converter element, uniform surface compression, and thus a consistent spacing between the converter element and the object, is ensured. The risk of any unilateral lifting of the converter element from the object, which exists where only one connection region is provided, is prevented by this configuration. Improved operational security is provided accordingly.

The converter element preferably comprises drawbar eyes in the connection regions. In the operating position, hooks, pins or similar elements of the transmission element engage in these drawbar eyes, and exert a force on the converter element. By the configuration of the eyes as a force transmission point, the converter device, and thus the sensor device, can be fitted in a particularly simple manner, as it is only necessary for the eyes to be fitted to one region of the transmission element.

The converter element is preferably configured as a flexible plastic plate, incorporating the conductor element. This form of embodiment permits a particularly uniform coverage of the object in the operating position. Preferably, the plastic plate is predominantly comprised of a polyimide. The high thermal resistance and substantially consistent elasticity thereof over a wide temperature range ensure a high degree of operational security of the sensor device, independently of the ambient temperature and the object temperature. The employment of a plastic plate permits a variety of different configurations of the at least one conductor element. The latter is preferably arranged in a meander-shaped pattern, or in a full-circumference arrangement on the plastic plate; in particular, a plurality of conductor elements are positioned one above another.

In an advantageous configuration of the invention, the converter element, in the operating position, is oriented in the tangential direction through an angle of at least 45°, and in particular at least 90° about the longitudinal axis. This minimum extent of coverage of the object in its circumferential direction permits the achievement of a particularly high operational security of the sensor device.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 6 shows an overall representation of a magnetization apparatus.

FIG. 7 shows an overall representation of the carrier device with two converter devices and three magnetization apparatuses, each in the installed state.

FIG. 8 shows an overall representation of the carrier device with two converter devices and five magnetization apparatuses, each in the installed state.

FIG. 9 shows an overall representation of a sensor device according to the invention, having a housing.

DETAILED DESCRIPTION OF THE DRAWINGS

The characteristics of the exemplary embodiments according to the invention described hereinafter can also be the object of the invention, whether individually or in combinations other than those represented or described. Insofar as appropriate, functionally equivalent components are identified by the same reference numbers.

Figure 1:
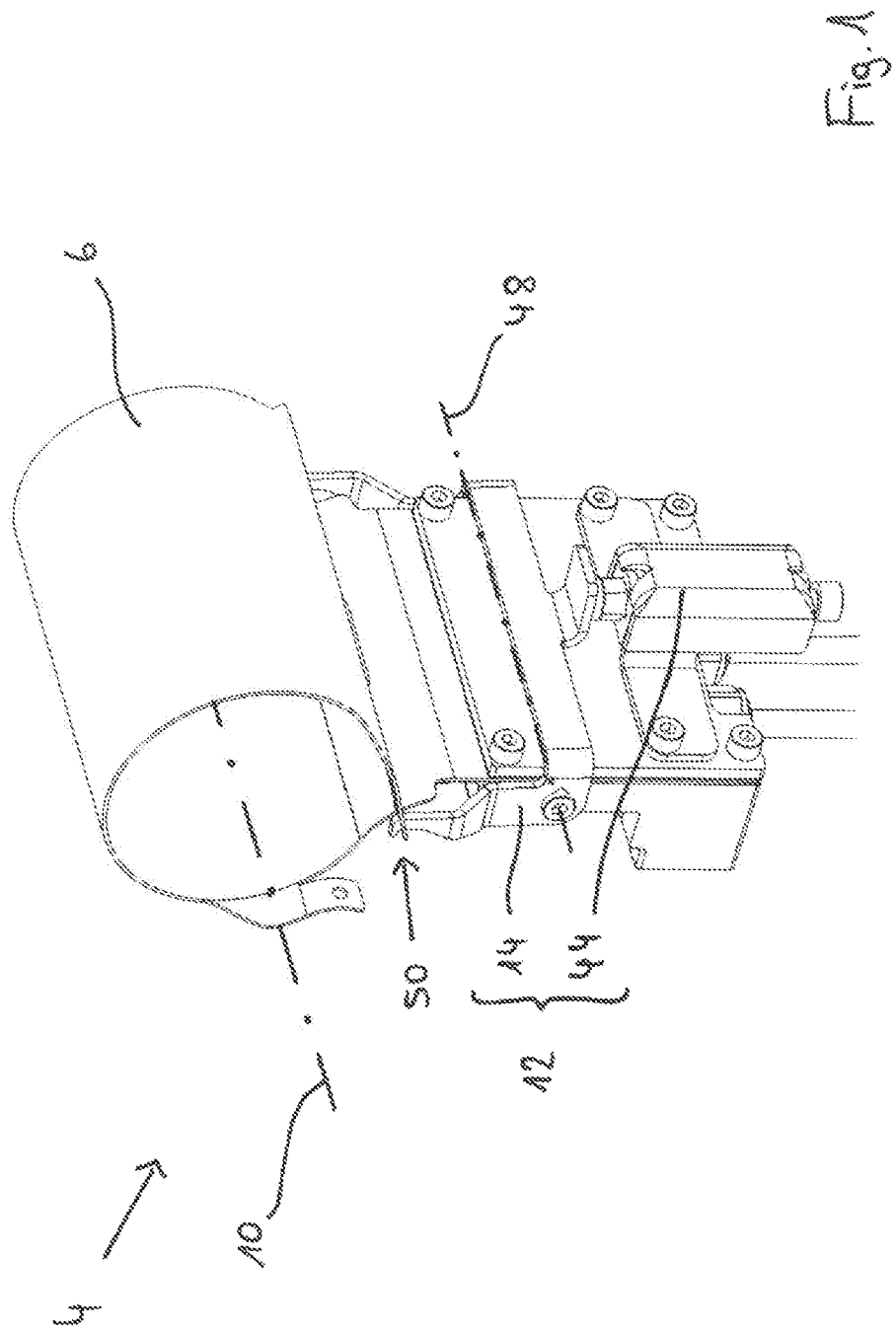
FIG. 1 shows an overall representation of a converter device.
Figure 2:
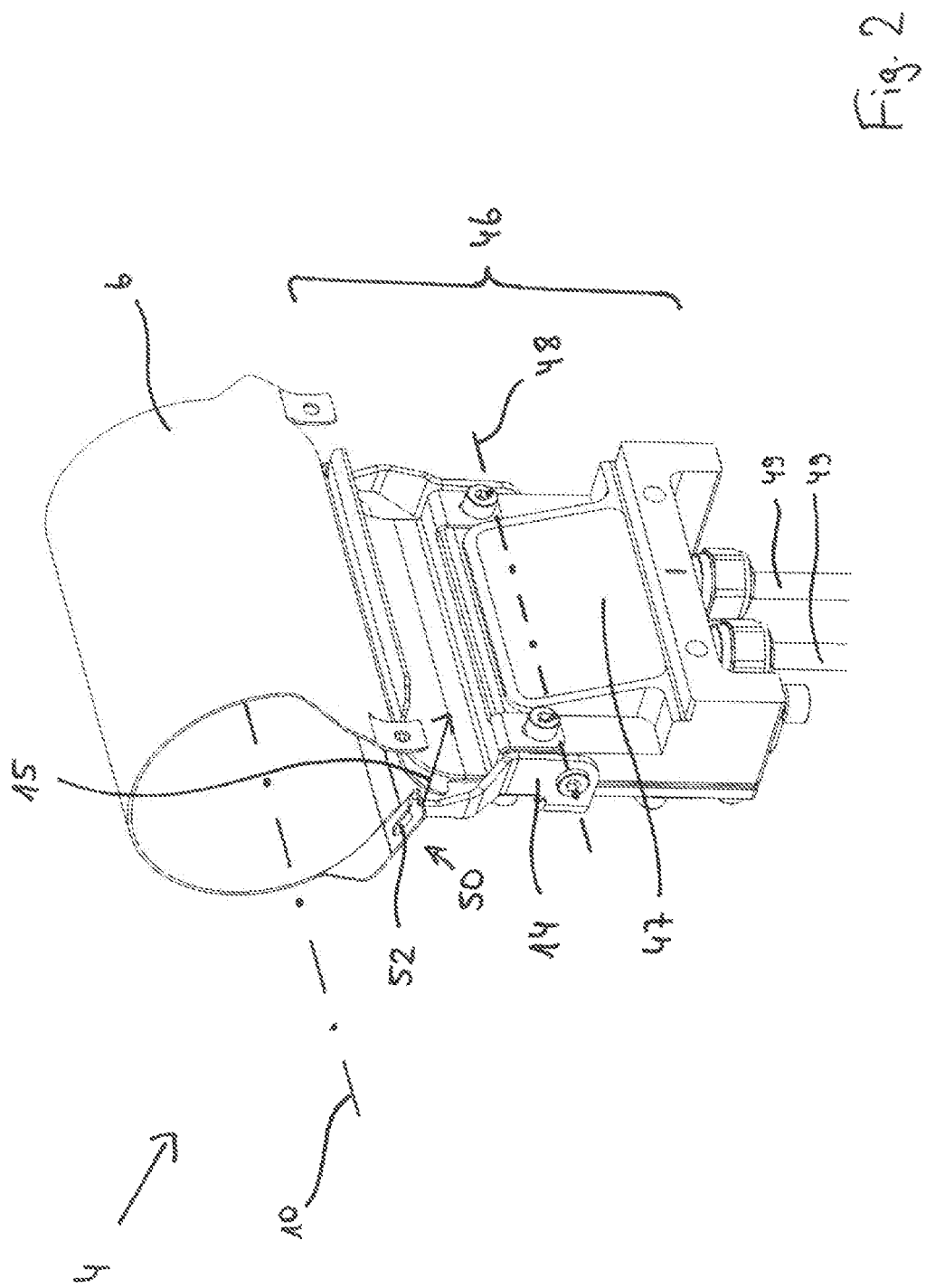
FIG. 2 shows an overall representation of the converter device, in an opposing perspective with respect to FIG. 1.

FIG. 1 and FIG. 2 show a converter device 4 with a flexible converter element 6. The converter element 6 comprises an electrically conductive conductor element and, for the sectional coverage of an object, is transposable into the operating position represented. The converter element 6 is arranged about a longitudinal axis 10. The converter device 4 comprises a resetting device 12 having a transmission element 14 and an energy store 44, by means of which the converter element 6 is set and/or reset in the operating position.

The converter device 4 comprises a connection device 46, by means of which the converter element 6 is secured by clamping. The resetting device 12 is braced against the connection device 46. The transmission element 14 applies a force to the converter element 6 in an essentially tangential direction 15 (c.f. FIG. 2). To this end, the transmission element 14 is pivotably mounted about a pivoting axis 48 which is arranged in parallel with the longitudinal axis 10. Within a potting region 47, the conductor element is connected to further elements for the relaying of any signal, which ultimately terminate in the connection elements 49 which are to be connected to the converter device. The interior space of the potting region 47 is thus potted with a plastic material.

The converter element 6 comprises two connection regions 50, which are spaced from one another in a parallel direction to the longitudinal axis 10, in which the converter element 6 constitutes drawbar eyes 52. The converter element 6, in the operating position represented, is oriented in the tangential direction through an angle of at least 270° about the longitudinal axis 10 of the sensor device 2.

Figure 3:
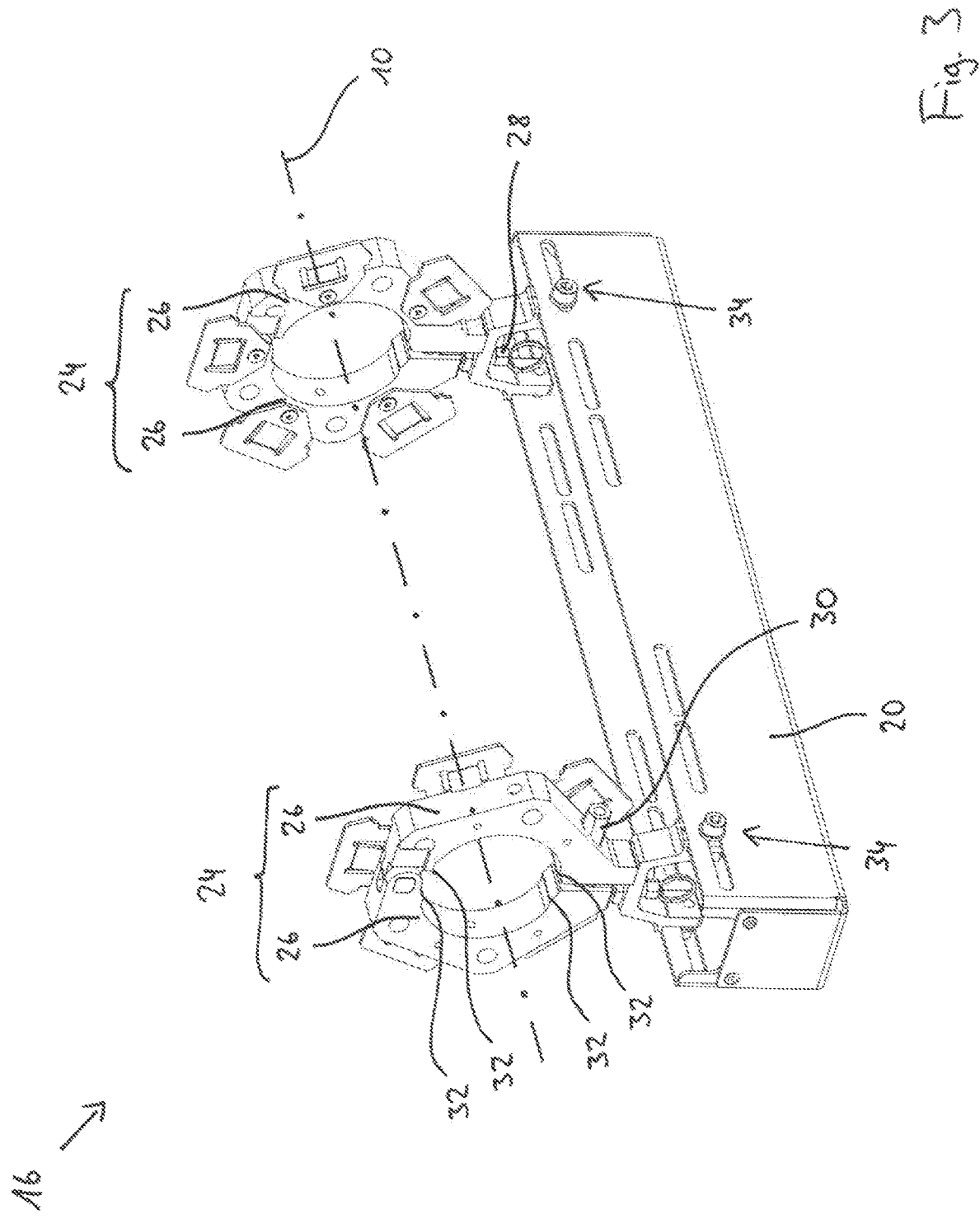
FIG. 3 shows an overall representation of a carrier device, with clamping apparatuses in a clamping position.

FIG. 3 shows a carrier device 16 which can be detachably fitted to the converter device 4 for the bracing of the sensor device 2 on the object. FIG. 9 additionally shows a housing 18 which encloses the converter device 4 and the carrier device The housing 18, in the direction of the longitudinal axis 10, assumes a greater extension than the carrier device 16. A thermally-insulating insulation material is arranged within the housing 18.

Figure 4:
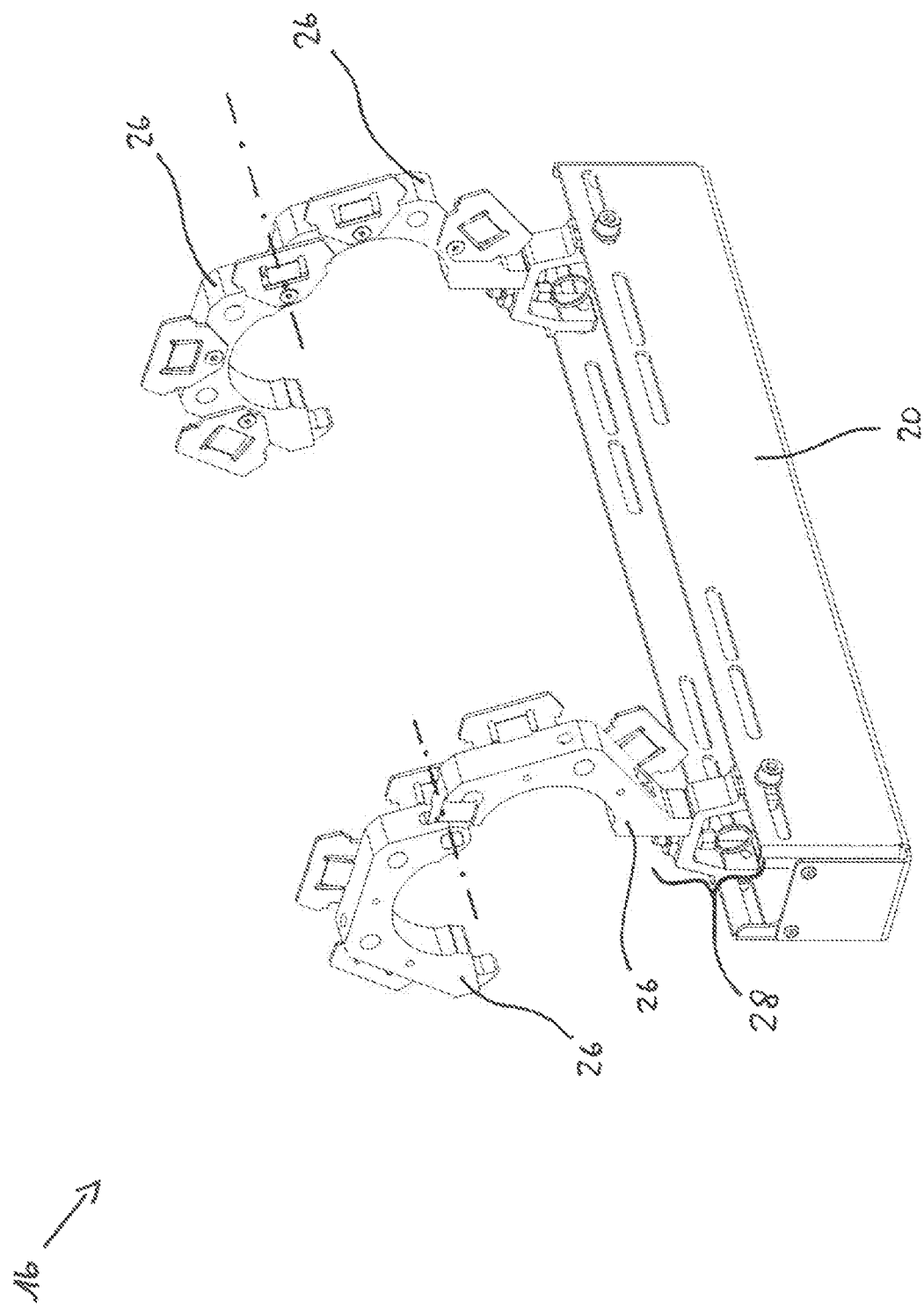
FIG. 4 shows an overall representation of the carrier device, with the clamping apparatuses out of the clamping position.
Figure 5:
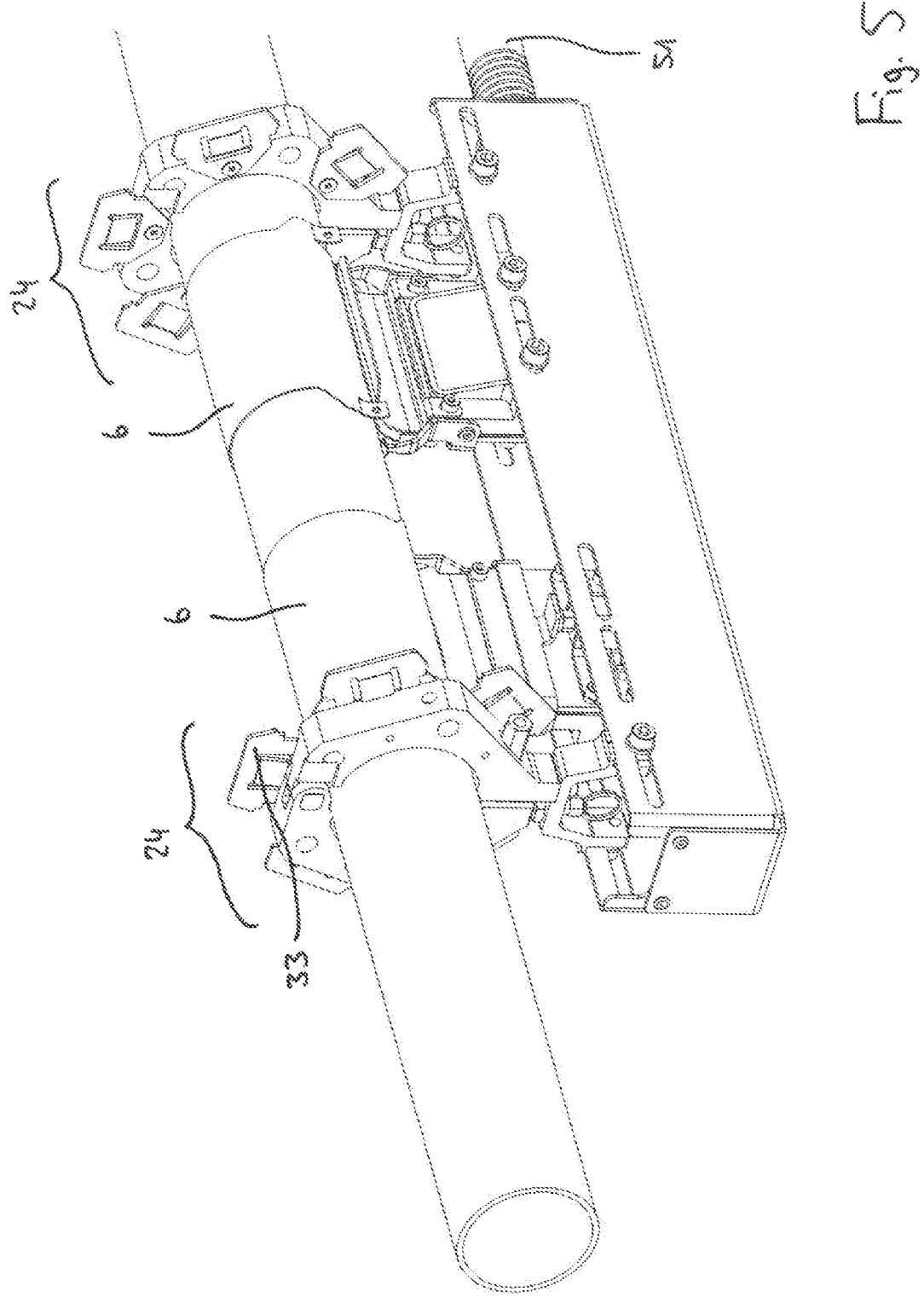
FIG. 5 shows an overall representation of the carrier device with two converter devices, each in the installed state.

The carrier device 16 (c.f. FIGS. 3, 4 and 5) comprises a receptacle 20 which at least partially encloses the converter device 4, and which accommodates a part of the connection device 46. The housing 18 is constituted in combination with the receptacle 20 (cf. FIG. 9). By means of the converter devices 4 and the receptacle 20, converter guide assemblies are constituted, by means of which the converter devices 4 can be displaced and fastened relative to the receptacle 20, parallel to the longitudinal axis 10. A protective plastic hose leads out of the receptacle 20, which contains the connection elements 49 which are connected to the connection devices 46, and protects the latter against environmental influences.

The carrier device 16 comprises two clamping apparatuses 24 for the detachable fastening of the sensor device 2 on the object (c.f. FIG. 5). FIG. 3 shows the clamping apparatuses 24 in their clamping position, and FIG. 4 shows the clamping apparatuses 24 in an open position.

The clamping apparatuses 24 are comprised of two clamping elements 26. The two clamping elements 26 which respectively constitute a clamping device 24 are pivotably arranged relative to one another. The clamping apparatus 24 comprises a latching assembly 28 for the latching of the clamping elements 26, further to the transposition thereof into the clamping position. The clamping apparatus 24 further comprises a pre-tensioning device 30 for pre-tensioning the clamping elements 26, which comprises a tensioning screw for the tensioning of the clamping elements 26 in a tangential direction to the longitudinal axis 10. Each clamping element 26 comprises two clamping webs 32 for the bracing of the clamping apparatus 24 on the object.

A receptacle guide assembly 34 is constituted by the clamping apparatus 24 and the receptacle 20. By means of said assembly, the clamping apparatuses 24 can be displaced and fastened relative to the receptacle 20, parallel to the longitudinal axis 10.

FIG. 6 shows a magnetization apparatus 36 for the generation of a static or quasi-static magnetic field. The magnetization apparatus 36 can be fastened on the carrier device 16 by means of two clamping connections 38 (c.f. FIG. 7). For the purposes of fastening, the magnetization apparatus 36 is moved onto the carrier device 16 in a radial direction. During this movement, two elastic wing elements 35 of a clamping web 33, on each clamping apparatus 24, are initially automatically deflected outwards, and ultimately move back into a clamped position, from which a release of the magnetization apparatus 36 is only possible by the application of a significant force, by means of which the wing elements 35 are moved away from one another.

The magnetization apparatus 36 comprises two magnets 39, which are spaced from one another in a parallel direction to the longitudinal axis 10. Both magnets 39 are secured on a magnet carrier 40. Each magnet 39 and the magnet carrier 40 constitute a magnet guide assembly 42. This comprises a slot which extends in parallel with the longitudinal axis 10 and a fixing screw. Accordingly, the magnets 38 can be displaced and fastened relative to the magnet carrier 40 in a parallel direction to the longitudinal axis 10. FIG. 8 shows five magnetization apparatuses 36 which are spaced from one another relative to the longitudinal axis 10 in a circumferential direction, and are arranged around the object on the clamping device 24.

The invention claimed is:

1. A sensor device for fitting to an object through which a medium flows, the sensor device comprising:
at least one converter device having at least one flexible converter element, the flexible converter element including at least one electrically conductive conductor element, the flexible converter element being for sectional coverage of the object and transposable to an operating position in which the flexible converter element is at least partially arranged about a longitudinal axis;
the converter device further including a resetting device and at least one transmission element, the at least one transmission element being arranged on the converter element, wherein the resetting device is provided for the setting and/or resetting of the converter element in the operating position;
wherein the resetting device comprises an energy storage device coupled to the at least one transmission element and that provides a first force that automatically sets and/or resets the converter element into the operating position in response to displacement of the resetting device.

2. The sensor device according to claim 1, further including a carrier device detachably fitted to the converter device for bracing the sensor device on the object, and further including a housing which at least partially encloses the converter device.

3. The sensor device according to claim 2, wherein the housing, which at least partially encloses the converter device and the longitudinal axis, is configured through at least 180° in the circumferential direction.

4. The sensor device according to claim 2, wherein the housing assumes a greater extension in the direction of the longitudinal axis than the carrier device.

5. The sensor device according to claim 2, wherein the carrier device comprises a receptacle which at least partially encloses the converter device.

6. The sensor device according to claim 5, wherein the housing is configured in combination with the receptacle of the carrier device.

7. The sensor device according to claim 5, wherein by means of the converter device and the carrier device, a converter guide assembly is configured such that the converter device and the carrier device can be displaced and fastened relative to one another, parallel to the longitudinal axis.

8. The sensor device according to claim 5, wherein the carrier device comprises at least one clamping apparatus which is transposable to a clamping position, for the detachable attachment of the sensor device to the object, comprising at least two clamping elements.

9. The sensor device according to claim 8, wherein the first clamping element is pivotably arranged relative to the second clamping element.

10. The sensor device according to claim 8, wherein the clamping apparatus comprises a latching assembly which latches the clamping elements relative to one another, further to the transposition thereof to the clamping position, and comprises a pre-tensioning device which pre-tensions the clamping elements.

11. The sensor device according to claim 10, wherein by means of the clamping apparatus and the receptacle, a receptacle guide assembly is configured such that the clamping apparatus and the receptacle can be displaced and fastened relative to one another, parallel to the longitudinal axis.

12. The sensor device according to claim 8, wherein the clamping apparatus comprises at least two clamping webs for the bracing of the clamping apparatus on the object.

13. The sensor device according to claim 2, wherein a thermally-insulating insulation material is arranged within the housing.

14. The sensor device according to claim 1, further including at least one magnetization apparatus for the generation of a static or quasi-static magnetic field.

15. The sensor device according to claim 14, wherein the magnetization apparatus is detachably fastened to the carrier device, by means of at least one clamping connection.

16. The sensor device according to claim 14, wherein the magnetization apparatus comprises at least two magnets which are spaced from one another in a parallel direction to the longitudinal axis.

17. The sensor device according to claim 16, wherein by means of the magnets and a magnet carrier of the magnetization apparatus, a magnet guide assembly is configured such that the magnets and the magnet carrier can be displaced and fastened relative to one another, parallel to the longitudinal axis.

18. The sensor device according to claim 14, wherein at least two magnetization apparatuses are arranged on the clamping apparatus, and are spaced from one another in a circumferential direction relative to the longitudinal axis.

19. The sensor device according to claim 1, wherein the converter device comprises a locating connection device for the clamping of the converter element.

20. The sensor device according to claim 1, further comprising at least two converter devices which are mutually spaced in a parallel direction to the longitudinal axis.

21. The sensor device according to claim 1, wherein the transmission element is arranged on the converter device to apply a second force to the converter element in an essentially tangential direction.

22. The sensor device according to claim 1, wherein the transmission element is pivotably mounted about a pivoting axis which is arranged in parallel with the longitudinal axis.

23. The sensor device according to claim 1, wherein the transmission element, in the operating position of the converter element; is arranged on at least two connection regions of the converter element, which are spaced from one another in a parallel direction to the longitudinal axis.

24. The sensor device according to claim 23, wherein the converter element is configured to constitute drawbar eyes in the connection regions.

25. The sensor device according to claim 1, wherein the converter element is configured as a flexible plastic plate, incorporating the conductor element.

26. The sensor device according to claim 1, wherein the converter element, in the operating position, is oriented in the tangential direction through an angle of at least 45 about the longitudinal axis (10).

* * * * *